United States Patent [19]

Kiefer et al.

[11] Patent Number: 5,795,590
[45] Date of Patent: Aug. 18, 1998

[54] SEAMLESS CAPSULES

[75] Inventors: Jesse J. Kiefer, Belvidere; Blake H. Glenn, Randolph, both of N.J.

[73] Assignee: Warner-Lambert Company, Morris Plains, N.J.

[21] Appl. No.: 686,649

[22] Filed: Jul. 24, 1996

Related U.S. Application Data

[62] Division of Ser. No. 412,672, Mar. 29, 1995, Pat. No. 5,595,757.

[51] Int. Cl.[6] ............................................. A61K 9/48
[52] U.S. Cl. ........................... 424/451; 424/454; 424/456; 424/461
[58] Field of Search ........................... 424/451, 457, 424/452; 209/625

[56] References Cited

U.S. PATENT DOCUMENTS

| | | |
|---|---|---|
| 2,857,281 | 10/1958 | Schultz et al. |
| 3,971,852 | 7/1976 | Brenner et al. |
| 4,251,195 | 2/1981 | Suzuki et al. |
| 4,279,632 | 7/1981 | Frosch et al. |
| 4,422,985 | 12/1983 | Morishita et al. |
| 4,695,466 | 9/1987 | Morishita et al. |
| 4,800,083 | 1/1989 | Hom et al. ............... 424/457 |
| 4,888,140 | 12/1989 | Schlameus et al. |
| 4,921,108 | 5/1990 | Berta .......................... 209/625 |
| 5,009,900 | 4/1991 | Levine et al. |
| 5,300,305 | 4/1994 | Stapler et al. |
| 5,370,864 | 12/1994 | Peterson et al. |
| 5,620,707 | 4/1997 | Sanker et al. |

FOREIGN PATENT DOCUMENTS

| | | |
|---|---|---|
| 0339958 | 11/1989 | European Pat. Off. |
| 0513563 | 11/1992 | European Pat. Off. |
| 0525731 | 2/1993 | European Pat. Off. |
| 563807 | 7/1975 | Switzerland. |
| 675370 | 9/1990 | Switzerland. |

*Primary Examiner*—Thurman K. Page
*Assistant Examiner*—William E. Benston, Jr.
*Attorney, Agent, or Firm*—Linda A. Vag

[57] ABSTRACT

The present invention is related to a seamless capsule comprising a shell material encapsulating a center-filled core material, wherein the shell material is formed of a carbohydrate in glassy state, and a method and an apparatus for making the seamless capsule.

13 Claims, 2 Drawing Sheets

SEAMLESS CAPSULES

This is a divisional of copending application Ser. No. 08/412,672 filed on Mar. 29, 1995, now U.S. Pat. No. 5,595,757.

BACKGROUND OF THE INVENTION

1. Field of the Invention

The present invention is related to a seamless capsule comprising a shell material encapsulating a center-filled core material, wherein the shell material is formed of a carbohydrate in glassy state, and a method and an apparatus for making the seamless capsule.

2. Description of the Prior Art

Traditionally, seamless capsules formed of a shell material encapsulating a core material have been made by using as the shell material film-forming materials such as gelatin and gums. These shell materials present two disadvantages. First, they are formed from an aqueous solution. Consequently, when the capsules are formed, large amounts of water must be removed, requiring great amounts of energy and long drying times. Second, these shell materials dissolve slowly when the capsules are being consumed, thereby leaving a distasteful plastic film-like residue in the mouth.

Seamless capsules are usually made by simultaneously extruding the shell material and the core material through concentrically aligned nozzles such that the extruded shell material and the extruded core material exit the nozzles as a coaxial jet with the shell material surrounding the core material into a stream of cooled carrier liquid that is flowing downward. While descending in the cooled carrier liquid, the coaxial jet breaks into droplets with the shell material encapsulating the core material. The droplets then solidify in the cooled carrier liquid to form seamless capsules. Such method is disclosed, for example, in U.S. Pat. Nos. 4,251,195 and 4,695,466. However, when the shell material is a material that solidifies quickly, this prior art method is disadvantageous in that the shell material in the coaxial jet may solidify prior to encapsulation. As a result, seamless capsules could not be formed, and any capsules that were formed were not spherical and did not have uniform size and shape.

An attempt to overcome this problem was proposed in U.S. Pat. No. 4,422,985, which describes a method that modifies the prior art method by introducing a coaxial triple jet consisting of a heated circulating liquid surrounding the shell material which in turn surrounds the core material into the cooled carrier liquid to allow encapsulation to take place. In this method, since capsule formation must still take place in the cooled carrier liquid, if any solidification of the shell material occurs prior to entering the cooled carrier liquid, encapsulation will not occur.

Other methods used for making capsules typically involve using a screw extruder to extrude an emulsion containing the shell matrix and the material to be encapsulated. However, in such process, it is difficult to make a capsule formed of a shell material encapsulating a center-filled core material. Instead, the encapsulated material is often in the form of globules that are distributed within the matrix.

U.S. Pat. No. 2,857,281 describes a process for making a solid flavoring composition in the form of globular particles by extruding an emulsion containing a sugar base and flavor oil into droplets.

U.S. Pat. No. 3,971,852 describes a process for encapsulating oil in a cellular matrix that is formed of polyhydroxy and polysaccharide compounds. The oil is in an emulsified state with the cellular matrix, and the resulting emulsion is spray dried as droplets of the emulsion.

U.S. Pat. No. 5,009,900 discloses a process for encapsulating volatile and/or labile components with extruded glassy matrices, wherein the encapsulated material is distributed in the glassy matrices.

European Patent Application No. 0339958 discloses an antifoaming composition containing an outer shell of a meltable sugar in its crystalline state with an organopolysiloxane antifoaming composition imbedded therein. This composition is formed by melting a sugar base and dispersing the organopolysiloxane antifoaming composition in the sugar melt as the discontinuous phase. The melt is then solidified, thereby imbedding and entrapping the antifoaming composition, which is dispersed in the melt.

U.S. Pat. No. 5,300,305 relates to microcapsules that provide long lasting breath protection.

SUMMARY OF THE INVENTION

A first aspect of the present invention provides a method for making a seamless capsule comprising a shell material encapsulating a core material comprising the steps of:

providing a concentrically aligned multiple nozzle system having at least an outer nozzle and an inner nozzle;

supplying a shell material to the outer nozzle and a core material to the inner nozzle;

simultaneously extruding the shell material through the outer nozzle and the core material through the inner nozzle, thereby forming a coaxial jet of the shell material surrounding the core material;

introducing the coaxial jet into a flow of a heated carrier liquid, thereby allowing the shell material to encapsulate the core material to form capsules in the heated carrier liquid; and introducing the capsules into a flow of a cooled carrier liquid, thereby allowing the capsules to solidify.

A second aspect of the present invention provides an apparatus for making a seamless capsule comprising:

a concentrically aligned multiple nozzle system having at least an outer nozzle and an inner nozzle for simultaneously extruding a shell material through the outer nozzle and a core material through an inner nozzle, thereby forming a coaxial jet of the shell material surrounding the core material;

means for supplying the shell material to the outer nozzle and the core material to the inner nozzle;

a first duct located beneath the multiple nozzle system for receiving the coaxial jet;

means for delivering a heated carrier liquid to the first duct to form a flow of the heated carrier liquid surrounding the coaxial jet, thereby allowing the shell material to encapsulate the core material to form capsules in the heated carrier liquid;

a second duct, at least a part of which is located beneath the first duct, for receiving the flow of the heated carrier liquid carrying the capsules from the first duct;

means for delivering a cooled carrier liquid into the second duct to form a flow of the cooled carrier liquid surrounding the capsules, thereby allowing the capsules to solidify.

A third aspect of the present invention provides a seamless capsule comprising a shell material encapsulating a center-filled core material, wherein the shell material comprises a carbohydrate in glassy state.

DETAILED DESCRIPTION OF THE INVENTION

The present inventors have discovered that seamless capsules can be formed by employing carbohydrates in glassy state as the shell materials. Because carbohydrates in glassy state are formed through solidification, capsule drying is not required. In addition, the carbohydrate shell materials dissolve rapidly and do not leave distasteful residues in the mouth.

Because carbohydrates solidify rapidly in a cooled medium, in the prior art method discussed above, prior to encapsulating the core material, the carbohydrate shell material already solidifies in the cooled carrier liquid. As a result, seamless capsules could not be formed, and any capsules that were formed were not spherical and did not have uniform size and shape.

The present inventors have discovered a method and an apparatus for making seamless capsules that overcome the drawbacks in the prior art and are capable of forming seamless capsules that are uniform in size and shape even when carbohydrates are used as the shell materials. In addition, this method and apparatus can make seamless capsules formed of a shell material encapsulating a single center-filled core material, i.e., the core material is not distributed or dispersed within the shell material matrix.

Figure 1:
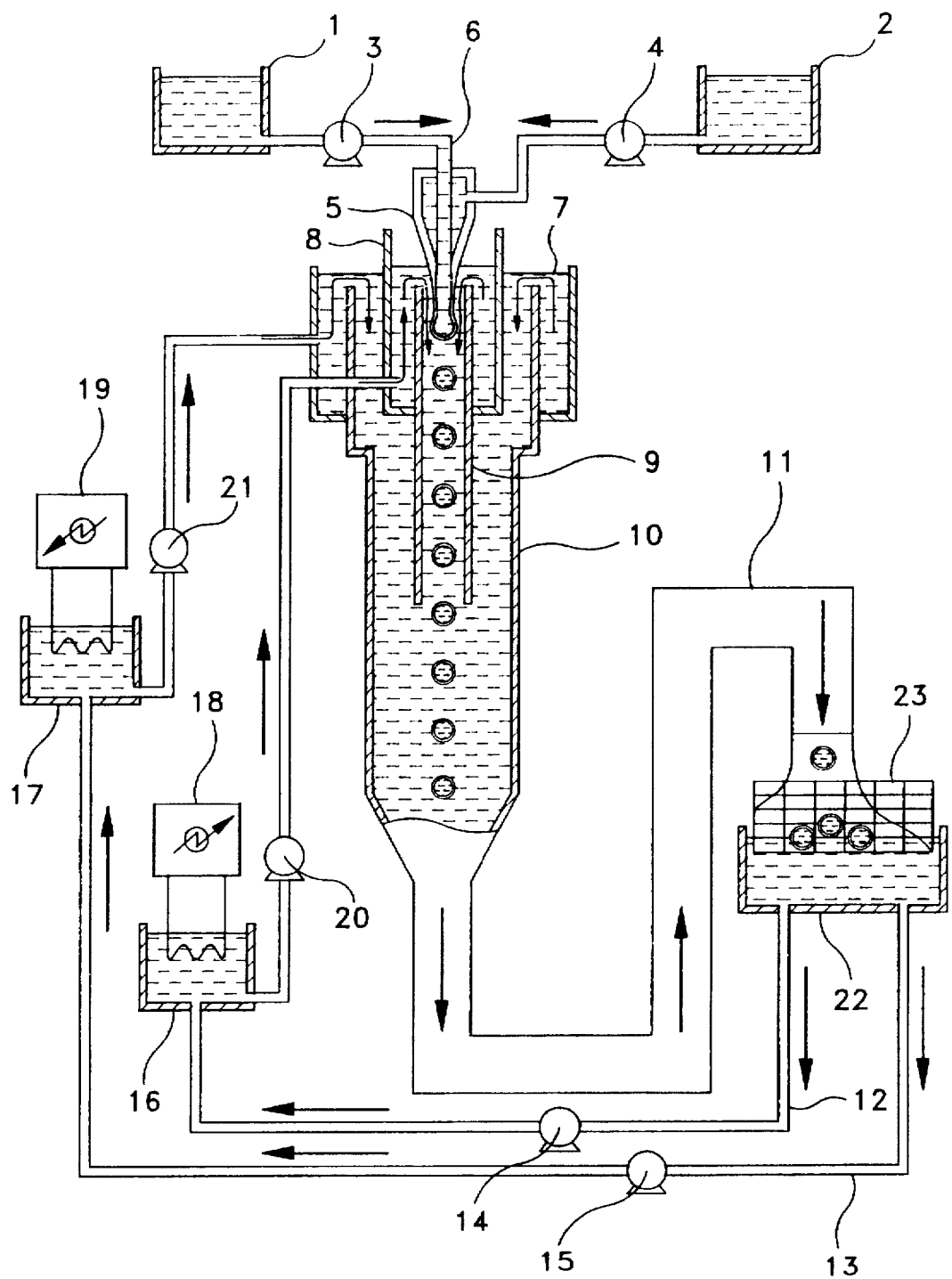
FIG. 1 illustrates a schematic sectional side view of an apparatus for making seamless capsules according to one embodiment of the present invention.

FIG. 1 illustrates an example of an apparatus that can be used to make a seamless capsule according to the present invention. The apparatus comprises a multiple nozzle system having an outer nozzle 5 and an inner nozzle 6, which are concentrically aligned. The inner nozzle 6 is connected to a tank 1, which supplies the core material to the inner nozzle 6 through a gear pump 3. The outer nozzle 5 is connected to a tank 2, which supplies the shell material to the outer nozzle 5 through a gear pump 4. A duct 9 is located beneath the multiple nozzle system. The upper part of the duct 9 is surrounded by a heating cylinder 8 in a concentric alignment. The heating cylinder 8 is connected to a tank 16, which is provided with a heater 18 for heating a carrier liquid that is fed through a feed pump 20 to the heating cylinder 8. The heating cylinder 8 has an overflow over the duct 9, thereby allowing the heated carrier liquid to flow from the heating cylinder 8 into the duct 9.

The lower end of the duct 9 extends into a duct 10. The upper part of the duct 10 is surrounded by a cooling cylinder 7 in a concentric alignment. The cooling cylinder 7 is connected to a tank 17, which is provided with a cooler 19 for cooling a carrier fluid. The cooled carrier fluid is fed through a feed pump 21 to the cooling cylinder 7. The cooling cylinder 7 has an overflow over the duct 10, thereby allowing the cooled carrier liquid to flow from the cooling cylinder 7 to the duct 10.

The lower end of the duct 10 forms a funnel-shape portion, which is connected to a recovery pipe 11. The recovery pipe 11 extends towards a circulating liquid tank 22 and terminates at a small distance from the top of the circulating liquid tank 22. Arranged on the circulating liquid tank 22 is a net-like separator 23 for separating capsules from the carrier liquid. The tank 22 is connected through a pipe 12, which passes through a recycle pump 14, to tank 16 for supplying the carrier liquid to be heated in tank 16. The tank 22 is also connected to a pipe 13, which passes through a recycle pump 15, for supplying the carrier liquid to be cooled in tank 17.

Figure 2:
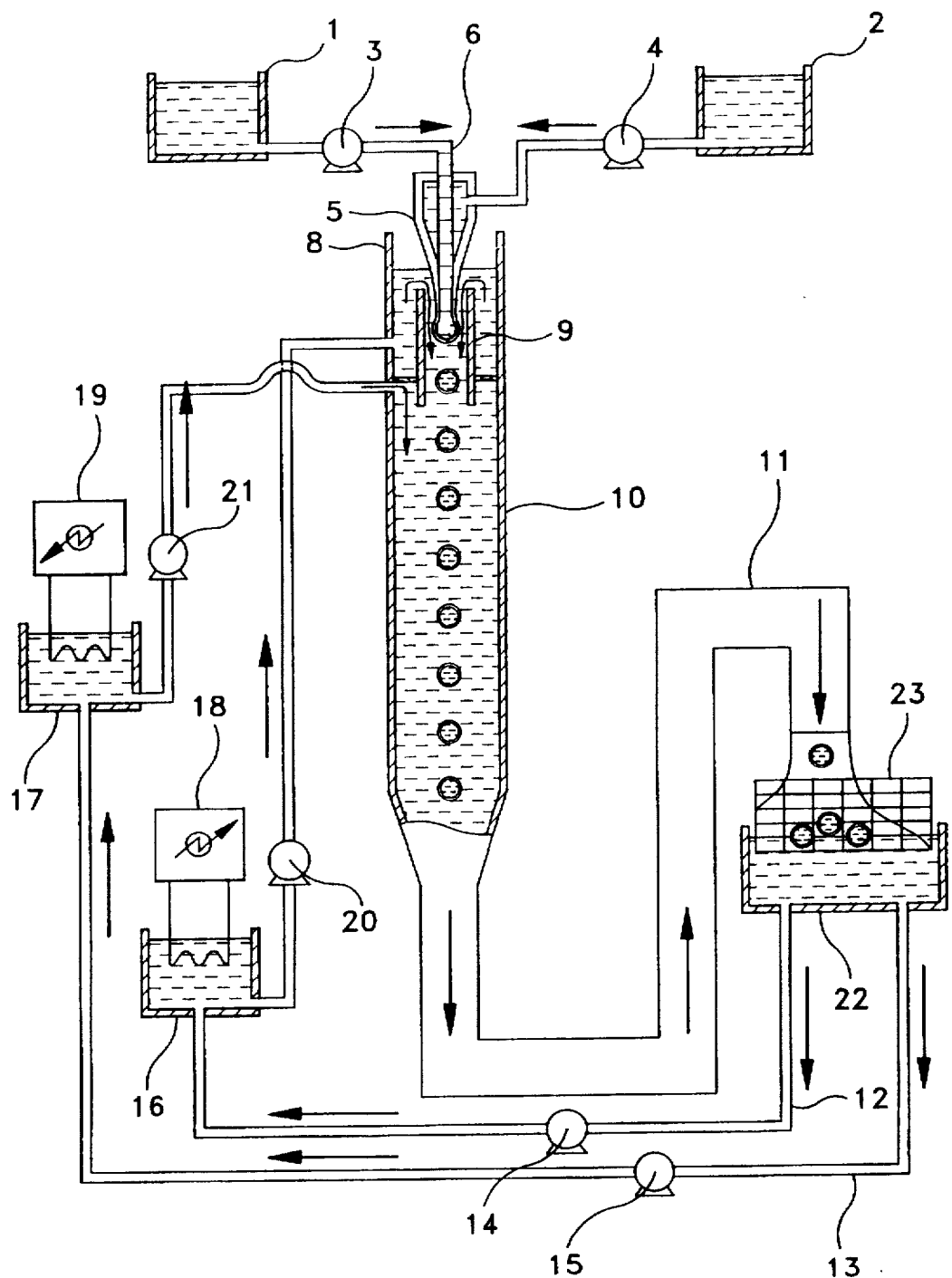
FIG. 2 illustrates a schematic sectional side view of an apparatus for making seamless capsules according to another embodiment of the present invention.

FIG. 2 illustrates an alternative embodiment of an apparatus that can be used to make the seamless capsules of this invention. The apparatus in this embodiment is similar to that depicted in FIG. 1, except that the cooled carrier liquid is pumped from the tank 17 directly into a duct 10 without using a cooling cylinder provided with an overflow into duct 10.

The process of making the seamless capsules will now be described in detail. The shell material is supplied from tank 2 into the outer nozzle 5 and the core material is supplied from the tank 1 into inner nozzle 6. The core material and the shell material are then simultaneously extruded to form a coaxial jet with the shell material surrounding the core material. The carrier liquid in tank 16 is heated to a temperature that is close or higher than the temperature of the shell material and is supplied to duct 9. Typically, the temperature of the heated carrier liquid is from about 90° to 160° C. The coaxial jet is introduced to the duct 9 containing the heated carrier liquid flowing downward. Because the heated carrier liquid is at a temperature that is close to or higher than the temperature of the shell material in the coaxial jet, it prevents the shell material from solidifying, thereby allowing the shell material to encapsulate the core material to form capsules.

The carrier liquid in tank 17 is cooled to a low enough temperature that can allow the capsules to solidify. Preferably, the carrier liquid is cooled to a temperature of from about 0° to 30° C. The cooled carrier liquid is supplied from tank 17 to duct 10. The capsules from duct 9 are then carried by the heated carrier liquid into duct 10 containing the cooled carrier liquid that is flowing downward. The final temperature of the combined streams is low enough so that the capsules are then cooled sufficiently to allow them to solidify in duct 10 to form the seamless capsules. The thus-formed seamless capsules are then transported through pipe 11 toward separator 23 located in tank 22. The separator 23 separates the seamless capsules from the carrier liquid to collect the seamless capsules. The separated carrier liquid flows into tank 22 and is then recycled to tanks 16 and 17 through pipes 14 and 16, respectively.

In an alternative embodiment, the coaxial jet simultaneously extruded from the multiple nozzles is introduced into air instead of a flow of the heated carrier liquid. As the coaxial jet descends through air for a sufficient distance, it breaks down into droplets, thereby allowing the shell material to encapsulate the core material to form capsules. Typically, the distance that the coaxial jet travels through air is from about 3 to about 15 cm. The capsules then descend into a flow of cooled carrier liquid to allow the capsules to solidify. The temperature of the air should be higher than that of the cooled carrier liquid and should be maintained within a range in which the shell material does not solidify within the travelled distance. The air temperature may be maintained at ambient temperature, i.e., from about 25° to 35° C, or in another embodiment, the air can be heated above ambient, at a preselected set point, for example, by the use of a tubular heater which maintains the air within at the preselected temperature.

Any liquid that does not dissolve the shell material and can be heated and cooled to the appropriate temperatures without undergoing phase change can be used as the carrier liquid in the present invention. Examples of suitable carrier liquids include medium chain triglyceride (MCT) oil, corn oil, cottonseed oil, canola (rapeseed) oil, sunflower oil, silicone oils, mineral oils and the like.

Preferably, the shell material and the core material are simultaneously extruded by setting the fluid volumetric flux of the shell material through the outer nozzle equal to the fluid volumetric flux of the core material through the inner nozzle. The fluid volumetric flux of a material flowing from a nozzle orifice is defined as the ratio of the volumetric flow rate of the material through the nozzle to the nozzle orifice area. As described by co-pending application Ser. No. 08/325,722, filed Oct. 7, 1994 (Attorney Docket No. PD-4872), the disclosure of which is hereby incorporated herein by reference, by setting the fluid volumetric flux of the shell material equal to that of the core material through the concentrically aligned nozzles, the mass ratio of the core material to the shell material in the capsule can be controlled by merely varying the size of the orifice areas of the nozzles.

The concentrically aligned multiple nozzle system that can be used in the present invention can have more than two concentrically aligned inner and outer nozzles. There can be one or more concentrically aligned intermediate nozzles positioned between the inner and outer nozzles, from which one or more intermediate shell materials can be extruded. In such embodiment, the shell material extruded from the outer nozzle encapsulates the intermediate shell material extruded from the intermediate nozzle, which in turn encapsulates the core material from the inner nozzle. In a preferred embodiment of this invention, the fluid volumetric flux of the intermediate shell material through the intermediate nozzle will be set to be equal to the fluid volumetric flux of shell material through the outer nozzle and the fluid volumetric flux of the core material through the inner nozzle.

Examples of suitable carbohydrates that can be used as the shell material in the present invention include sucrose, glucose, fructose, Isomalt, hydrogenated starch hydrolysate, maltitol, lactitol, xylitol, sorbitol, erythritol, mannitol, and the like, and mixtures thereof. Typically, the carbohydrate is fed into the outer nozzle as the shell material in the form of a melt. When the carbohydrate solidifies in the cooled carrier liquid, it turns into a glassy state, i.e., amorphous state. When the carbohydrate is in a glassy state, it exhibits an enhanced ability to protect the center-filled core material from vaporization and deterioration.

Suitable core materials are typically in liquid form or meltable solid materials. Examples of suitable core materials include MCT oils (e.g., such as coconut oil), peppermint oil, cinnamon oil, fennel oil, clove oil, wheat-germ oil, vegetable oils (e.g., corn oil, cottonseed oil, canola (rapeseed) oil, sunflower oil and the like), silicone oils, mineral oils, fruit flavors, vitamins, pharmaceutical solutions, natural and artificial sweeteners, menthol, and the like.

Any material that is liquid at the operating temperature and does not dissolve the core or shell materials and further solidifies during the cooling process may be used as an intermediate shell material. Examples of suitable intermediate shell materials include waxes (e.g., paraffin wax, microcrystalline wax, polyethylene wax, carnauba wax, candelilla wax and the like) and fats (e.g., hydrogenated fats such as those known to persons of skill in the art).

The present invention is useful for making seamless capsules for a variety of applications, such as center-filled chewing gums, encapsulated medicines, foods, cosmetics, industrial chemicals and the like.

The present invention will now be illustrated by the following non-limiting Example.

EXAMPLE

Seamless capsules were prepared by using a concentrically aligned multiple nozzle system having an inner nozzle and an outer nozzle. The inner nozzle had an inside diameter of 0.20 cm, an outside diameter of 0.26 cm, and an orifice area of 0.0314 $cm^2$. The outer nozzle had an inside diameter of 0.39 cm and an annular orifice area of 0.0664 $cm^2$. A mixture of 90 wt. % isomalt and 10 wt. % xylitol was melted at a temperature of 155° C. and maintained in a tank at 148° C. This mixture had an actual viscosity of 628 cps at 140° C. Generally, the methods of the present invention would involve the use of shell materials having an actual viscosity of less than about 1,000 cps at the operating temperature. The resultant mixture had a density of 1.00 g/ml. The mixture was then fed to the outer nozzle as the shell material at a temperature of 145° C. and a volumetric flow rate of 2.37 ml/min. A mixture of 10 wt. % cherry flavor and 90 wt. % cotton seed oil having a density of 0.96 g/ml was supplied to the inner nozzle as the core material at ambient temperature and a volumetric flow rate of 5.01 ml/min. The shell material and the core material were then simultaneously extruded from the outer and inner nozzles, respectively, at the same fluid volumetric flux of 75.5 ml/min. $cm^2$ into air, which was maintained at ambient temperature. The coaxial jet descended through air for 10 cm and broke down into droplets to allow encapsulation to take place. The capsules then descended into coconut oil cooled to a temperature of 20° C. and flowing downward at a rate of 1,000 ml/min. The resultant capsules collected had a diameter of about 4 mm and contained 68.78 wt. % of the shell material in a glassy state and 31.22 wt. % of the core material.

While the present invention has been described with respect to what is presently considered to be the preferred embodiments, it is to be understood that the invention is not limited to the disclosed embodiments. The present invention is intended to cover various modifications and equivalent mechanisms included within the spirit and scope of the appended claims.

What is claimed is:

1. An apparatus for making a seamless capsule comprising a shell material encapsulating a center-filled core material comprising:

a concentrically aligned multiple nozzle system having at least an outer nozzle and an inner nozzle for simultaneously extruding a shell material through the outer nozzle and a core material through an inner nozzle, thereby forming a coaxial jet of the shell material surrounding the core material;

means for supplying the shell material to the outer nozzle and the core material to the inner nozzle;

a first duct located beneath the multiple nozzle system for receiving the coaxial jet;

means for delivering a heated carrier liquid to the first duct to form a flow of the heated carrier liquid surrounding the coaxial jet, thereby allowing the shell material to encapsulate the core material to form capsules in the heated carrier liquid;

a second duct, at least a part of which is located beneath the first duct, for receiving the flow of the heated carrier liquid carrying the capsules from the first duct;

means for delivering a cooled carrier liquid into the second duct to form a flow of the cooled carrier liquid surrounding the capsules, thereby allowing the capsules to solidify.

2. The apparatus according to claim 1, wherein the upper part of the first duct is surrounded by a heating cylinder in a concentric alignment.

3. The apparatus according to claim 2, wherein the heating cylinder has an overflow over the top of the first duct.

4. The apparatus according to claim 1, wherein the lower end of the first duct extends into the second duct.

5. The apparatus according to claim 1, wherein the upper part of the second duct is surrounded by a cooling cylinder in a concentric alignment.

6. The apparatus according to claim 1, wherein the cooling cylinder has an overflow over the top of the second duct.

7. The apparatus according to claim 1, wherein the second duct is connected to a recovery pipe.

8. The apparatus according to claim 1, wherein said multiple nozzle system further comprises at least one intermediate nozzle positioned between the inner and outer nozzles.

9. A seamless capsule comprising a shell material encapsulating a center-filled core material, wherein the shell material comprises a carbohydrate in glassy state.

10. The seamless capsule according to claim 9, wherein the carbohydrate is selected from sucrose, glucose, fructose, isomalt, hydrogenated starch hydrolysate, maltitol, lactitol, xylitol, sorbitol, erythritol, mannitol, and mixtures thereof.

11. The seamless capsule according to claim 9, wherein the core material is selected from coconut oil, peppermint oil, cinnamon oil, fennel oil, clove oil, wheat-germ oil, vegetable oil, vitamins, pharmaceutical solutions, natural and artificial sweeteners, fruit flavors, menthol, and mixtures thereof.

12. The seamless capsule according to claim 9, wherein the shell material encapsulates at least one intermediate shell material which encapsulates the core material.

13. A seamless capsule comprising a shell material encapsulating a center-filled core material made according to a method comprising the steps of:

providing a concentrically aligned multiple nozzle system having at least an outer nozzle and an inner nozzle;

supplying a shell material to the outer nozzle and a core material to the inner nozzle;

simultaneously extruding the shell material through the outer nozzle and the core material through the inner nozzle, thereby forming a coaxial jet of the shell material surrounding the core material;

introducing the coaxial jet into the flow of a heated carrier liquid or air, thereby allowing the shell material to encapsulate the core material to form capsules in the heated carrier liquid; and introducing the capsules into a flow of a cooled carrier liquid, thereby allowing the capsules to solidify.

* * * * *